(12) United States Patent
Bass

(10) Patent No.: US 11,002,609 B2
(45) Date of Patent: May 11, 2021

(54) TEMPERATURE SENSING DEVICE

(71) Applicant: Parker Bass, Rogersville, MO (US)

(72) Inventor: Parker Bass, Rogersville, MO (US)

( * ) Notice: Subject to any disclaimer, the term of this patent is extended or adjusted under 35 U.S.C. 154(b) by 372 days.

(21) Appl. No.: 16/149,926

(22) Filed: Oct. 2, 2018

(65) Prior Publication Data

US 2019/0101452 A1 Apr. 4, 2019

Related U.S. Application Data

(60) Provisional application No. 62/567,749, filed on Oct. 3, 2017.

(51) Int. Cl.
*G01K 1/024* (2021.01)
*H01H 37/52* (2006.01)

(52) U.S. Cl.
CPC ............ *G01K 1/024* (2013.01); *H01H 37/52* (2013.01); *G01K 2215/00* (2013.01)

(58) Field of Classification Search
CPC ..... G01K 1/024; G01K 2215/00; H01H 37/52
See application file for complete search history.

(56) References Cited

U.S. PATENT DOCUMENTS

| | | | | |
|---|---|---|---|---|
| 2,745,285 A * | 5/1956 | Wannamaker, Jr. | ... | G01K 7/021 318/641 |
| 2,929,968 A * | 3/1960 | Henisch | ................. | G05D 23/24 361/165 |
| 4,700,436 A * | 10/1987 | Morita | ..................... | E05C 19/16 24/303 |
| 4,712,055 A * | 12/1987 | Houser, Jr. | ............ | H02J 7/0091 320/144 |
| 4,842,419 A * | 6/1989 | Nietert | ..................... | G01K 7/22 337/107 |
| 5,043,690 A * | 8/1991 | Wahls | ..................... | H01H 37/54 337/370 |
| 5,200,736 A * | 4/1993 | Coombs | ................. | G01K 3/005 2/5 |
| 5,697,552 A * | 12/1997 | McHugh | ............ | G05D 23/1904 165/270 |
| 5,875,085 A * | 2/1999 | Farley | ..................... | H01L 29/78 361/18 |
| 6,707,273 B1 * | 3/2004 | Gignac | ............. | H02J 7/007192 320/150 |
| 6,836,205 B2 * | 12/2004 | Scott | ................... | H01H 37/5427 337/299 |
| 7,358,740 B2 * | 4/2008 | Davis | ..................... | H01H 37/54 324/417 |
| 9,291,203 B2 * | 3/2016 | Lewis | ..................... | G01K 13/02 |
| 9,939,165 B2 * | 4/2018 | Oh | ..................... | G05D 23/2754 |
| 2002/0060622 A1 * | 5/2002 | Scott | ................... | H01H 37/5427 337/343 |
| 2006/0208846 A1 * | 9/2006 | Davis | ..................... | H01H 37/54 337/333 |

(Continued)

*Primary Examiner* — Nathaniel T Woodward
*Assistant Examiner* — Philip L Cotey
(74) *Attorney, Agent, or Firm* — Erickson Kernell IP, LLC; Mark C. Young

(57) ABSTRACT

A temperature sensing device includes a sensor module operable to measure the temperature of a piece of equipment, a component of a piece of equipment, an area, or other desired location or apparatus. A thermostatic switch is connected between a battery and the sensor module so that electrical current is provided from the battery to the sensor module only when the thermostatic switch is closed.

13 Claims, 3 Drawing Sheets

(56) References Cited

U.S. PATENT DOCUMENTS

| | | | |
|---|---|---|---|
| 2012/0212210 A1* | 8/2012 | Takeda | H01H 37/54 323/370 |
| 2014/0266741 A1* | 9/2014 | Lewis | G01K 13/02 340/584 |
| 2014/0301525 A1* | 10/2014 | Reynolds, IV | G07C 3/00 377/15 |
| 2015/0345818 A1* | 12/2015 | Oh | F24F 11/62 236/1 C |
| 2017/0033576 A1* | 2/2017 | Qu | H01M 10/0525 |
| 2017/0179713 A1* | 6/2017 | Bourns | H01M 2/202 |

* cited by examiner

TEMPERATURE SENSING DEVICE

CROSS-REFERENCE TO RELATED APPLICATIONS

This application claims the benefit of U.S. Provisional Patent Application No. 62/567,749, filed Oct. 3, 2017, the disclosure of which is hereby incorporated herein in its entirety by reference.

BACKGROUND

Remote monitoring of temperatures is desirable in numerous applications and industries. For example, the agricultural, automotive, industrial, shipping, and manufacturing fields all rely on monitoring the temperatures of various locations, buildings and equipment, or the temperature of components associated with various drive, conveyor, lifting, and other powered movement apparatus. For example, measuring the temperature of bearings used in various rotational equipment is advantageous in identifying potential malfunction of a bearing before catastrophic failure occurs.

Because of the numerous potential locations in which temperatures may need to be monitored, and because of the mobility of equipment in which temperatures may need to be monitored, it is often not practical to employ hardwired sensors that provide temperature data to a central location. Thus, wireless temperature sensors are widely used to transmit temperature data from desired equipment and/or locations to a central location where the data can be monitored and acted upon.

While known wireless temperature sensors serve their purpose, they are not without drawbacks. Primarily, because the wireless temperature sensors are remotely mounted and not hardwired, power for the sensor must be derived from a local battery. In the case of tight quarters for monitoring the temperature, the battery must be relatively small in order for the overall temperature sensor package to likewise be small enough to fit in desired locations, with the smaller battery limiting the operational time of the device before the battery must be replaced.

Although larger batteries (or multiple batteries) may be used to increase the operational time, larger batteries increase the cost of the device, and the larger physical size required by larger (or multiple) batteries may prohibit the sensor from being useful in circumstances where physical space is limited. Known schemes to conserve battery power likewise have disadvantages. For example, limiting the duty cycle or frequency of transmission of wireless data to conserve battery power can result in potentially missing the onset of a critical temperature event and thus compromising the purpose of monitoring the temperature in the first place.

Thus, it can be seen that there remains a need in the art for a temperature sensing device that is reliable and provides long duration operation.

SUMMARY

Embodiments of the invention are defined by the claims below, not this summary. A high-level overview of various aspects of the invention is provided here to introduce a selection of concepts that are further described in the Detailed Description section below. This summary is not intended to identify key features or essential features of the claimed subject matter, nor is it intended to be used in isolation to determine the scope of the claimed subject matter. In brief, this disclosure describes a temperature sensing device having thermostatic switch that provides power to a sensor module only when the temperature is above a predetermined threshold.

In one exemplary embodiment, the temperature sensing device comprises a sensor module operable to measure the temperature of a piece of equipment, a component of a piece of equipment, an area, or other desired location or apparatus. A thermostatic switch is connected between a battery and the sensor module so that electrical current is provided from the battery to the sensor module only when the thermostatic switch is closed.

When the temperature of the thermostatic switch reaches a predetermined threshold, the switch closes, powering the sensor module, which provides a signal corresponding to a detected temperature. Thus, for applications where a high temperature is of concern, the thermostatic switch acts to prohibit power to the sensor module (thus preserving battery life) until the detected temperature approaches the level of concern.

Preferably, the signal module includes a wireless transmitter which transmits the detected temperature to a remote location. In one embodiment, the sensor module is preferably enclosed in a case, with an attachment mechanism, such as a permanent magnet, allowing the temperature sensing device to be attached to the location at which the temperature is to be measured.

In one exemplary embodiment, the temperature sensing device is configured to measure the temperature of a bearing mounted in a bearing housing or pillow block.

In other alternative embodiments, the thermostatic switch is configured to close when the temperature falls below a predetermined threshold for use in applications where a falling temperature is of concern.

Thus, because battery power is not applied to the sensor module until a predetermined temperature is reached and the thermostatic switch closes, the life of the battery is extended well beyond the life expectancy of a battery powering a sensor module continuously as in configurations known in the prior art.

DESCRIPTION OF THE DRAWINGS

Illustrative embodiments of the invention are described in detail below with reference to the attached drawing figures, and wherein.

DETAILED DESCRIPTION

The subject matter of select embodiments of the invention is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described. The terms "about" or "approximately" as used herein denote deviations from the exact value in the form of changes or deviations that are insignificant to the function.

Embodiments of the invention include a device for monitoring the temperature of a piece of equipment, a component of a piece of equipment, an area, or other desired location or apparatus. Various embodiments employ various combinations of elements and components for detecting the temperature of the equipment or area being monitored, and providing power to a sensor module only when the temperature reaches a predetermined threshold.

Figure 3:
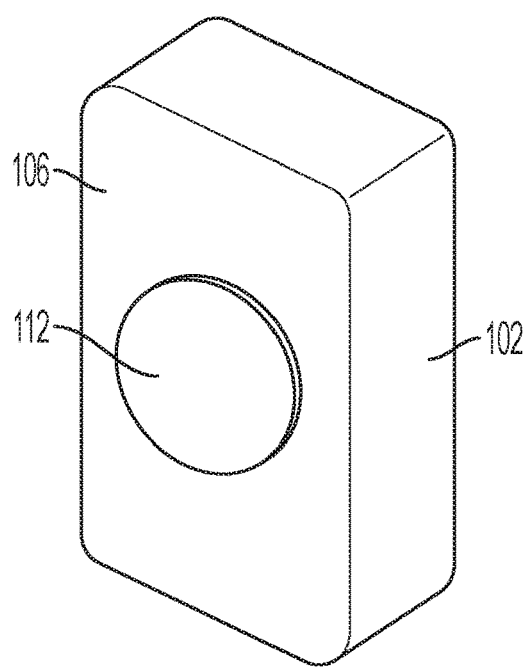
FIG. 3 is a rear perspective view of the temperature sensing device of FIG. 2.

Looking to FIG. 3, a schematic circuit diagram of a temperature sensing device in accordance with an exemplary embodiment of the present invention is depicted generally by the numeral 200. The temperature sensing device includes a sensor module 202, a battery 204, a thermostatic switch 206, an override switch 208, and an indicator LED (light emitting diode) 210.

Sensor module 202 includes a temperature sensing component 212 in communication with a wireless transmitter 214. Temperature sensing component 212 is preferably a resistance temperature detector (RTD) or thermistor, thermocouple, semiconductor temperature device, or other device known in the art that provides an electrical signal corresponding to a detected temperature. Wireless transmitter 214 is preferably a Wi-Fi transmitter, operable to transmit a signal corresponding to a temperature detected by the temperature sensing component 212 and communicated to the wireless transmitter 214. It should be understood that other wireless transmitters and/or transmitter protocols, such as radio, Bluetooth, LASER, infrared, and the like may likewise be used within the scope of the present invention.

Battery 204 may be any type of sealed battery as known in the art, such as lead acid, nickel metal hydride, lithium ion, nickel cadmium, or the like. While the battery 204 illustrated includes three cells, batteries having other number of cells, or combinations of batteries with a different number of cells, may likewise be used. Battery 204 is preferably packaged as an AA, AAA, or 9 volt rectangular package that may be replaced by a user. In alternative embodiments, the battery may be rechargeable by a user either upon removal from the temperature sensing device or while still installed via a charging port. In further embodiments, the battery may be sealed within the case of the device and not replaceable by a user.

Thermostatic switch 206 is preferably a bimetallic switch comprised of dissimilar metals, as is known in the art, operable to close when the temperature of the switch reaches a predetermined threshold, and to open when the temperature of the switch falls below that threshold.

As seen in the schematic diagram 200, the negative terminal of the batter is connected to the ground (GND) terminal of the sensor module 202.

With the positive terminal of the battery 204 connected to one side of the thermostatic switch 206 as shown in the schematic diagram 200, and with the other side of the thermostatic switch 206 connected to the voltage in (Vin) terminal of the sensor module 202, it can be seen that power is supplied from the battery 204 to the sensor module 202 when the thermostatic switch 206 closes—i.e., when the temperature of the switch reaches a predetermined threshold temperature. Likewise, power from the battery 204 will be removed from the sensor module 202 when the thermostatic switch 206 opens—i.e., when the temperature of the switch falls below the predetermined threshold temperature.

As just described, power, or electrical current, from the battery 204 is supplied to the sensor module 202 when the temperature of the thermostatic switch 206 reaches a predetermined threshold. Until that occurs, the battery 204 is disconnected from the sensor module 202, thus preserving and prolonging the life of the battery.

It should be understood that, for under-temperature applications, that thermostatic switch 206 may be configured to remain open until the temperature falls below a predetermined threshold. Thus, in addition to providing extended operational time when used in detecting over-temperature conditions, the temperature sensing device of the present application may likewise be used to provide extended operation time for use in under-temperature conditions, such as detecting potential freezing conditions.

Override switch 208 is preferably a single-pole, single-throw toggle switch that allows a user to manually connect the battery 204 to the sensor module for testing, maintenance, or other situations in which it is desired that the sensor module operate to detect and wirelessly transmit temperature information when the thermostatic switch 206 is not already closed. Override switch 208 may be any type of switch known in the art, such as a toggle switch, or push-on/push-off push button switch. In one preferred embodiment, the override switch 208 is a momentary pushbutton that allows temporary activation of the override mode of operation.

Indicator LED 210 is connected between the Vin terminal of the sensor module 202 and the negative terminal of the battery to provide a visual indication of power applied to the sensor module. Indicator LED 210 preferably includes an internal current limiting resistor, in alternative embodiments the current limiting resistor may be externally connected as is known in the art.

Figure 1:
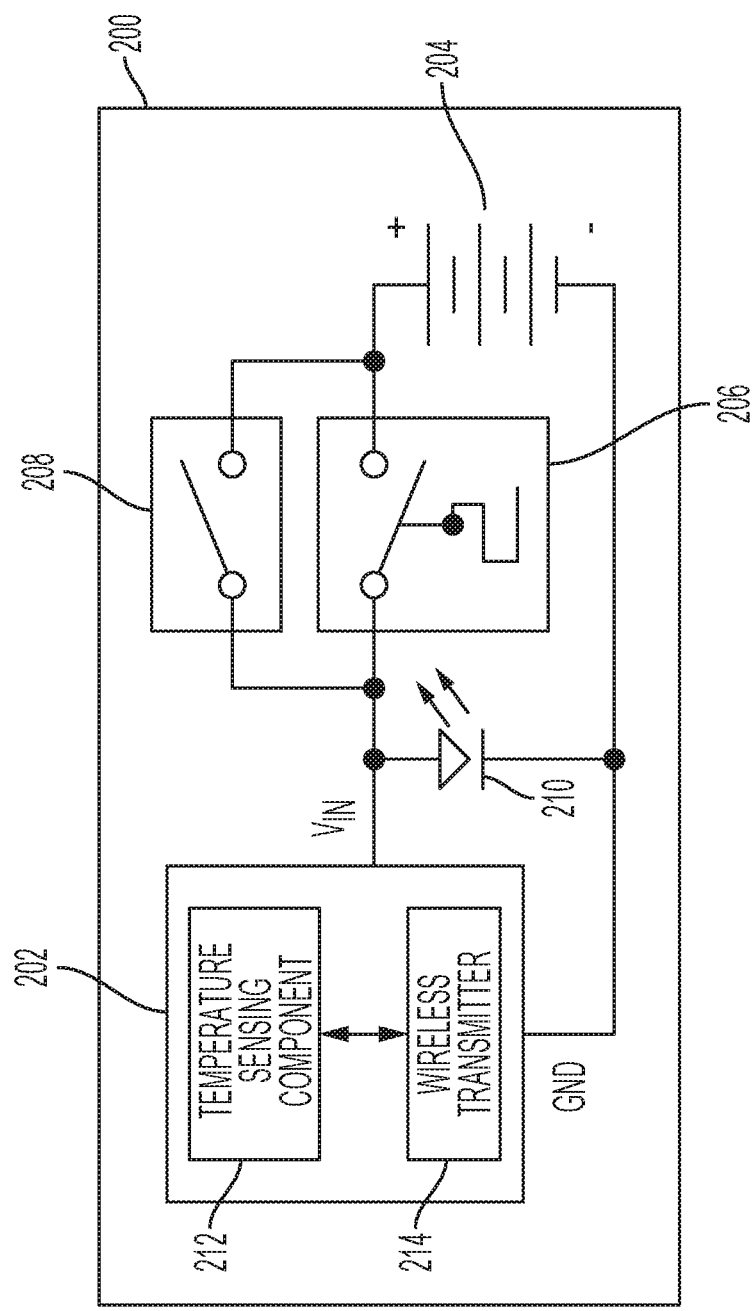
FIG. 1 is schematic circuit diagram of a temperature sensing device in accordance with an exemplary embodiment of the present invention.
Figure 2:
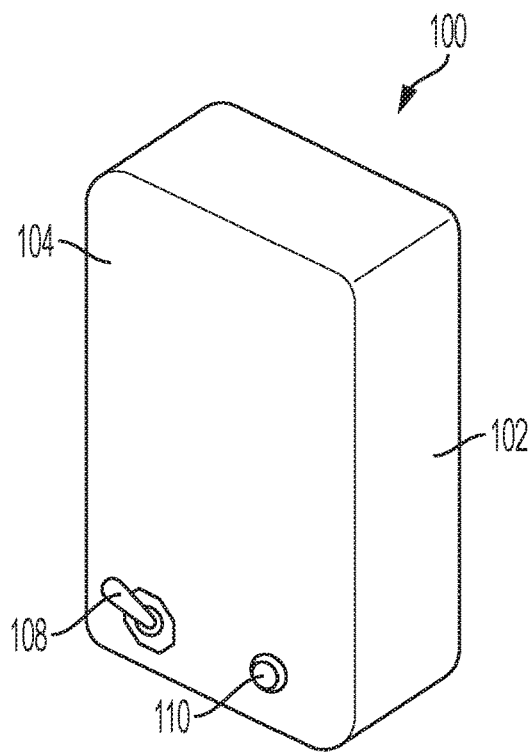
FIG. 2 is a front perspective view of a temperature sensing device in accordance with an exemplary embodiment of the present invention.

Looking to FIGS. 1 and 2, a temperature sensing device in accordance with an exemplary embodiment of the present invention is depicted generally by the numeral 100. The temperature sensing device 100 comprises a case 102 having a front panel 104 and rear panel 106, with a manual override switch 108 and indicator LED 110 positioned along the lower edge of the front panel 104.

It should be understood that circuitry corresponding to the schematic diagram of FIG. 3 is contained within the case 102 (sensor module, battery, thermostatic switch, override switch, and indicator LED) with override switch 108 corresponding to the override switch 208 of the schematic of FIG. 3, and with the indicator LED 110 corresponding to the indicator LED 210 of FIG. 3.

Preferably, the circuitry enclosed in the case 102 is in thermal communication with the case so that the temperature of the case is transferred to the contained circuitry, including the thermostatic switch and the temperature sensing component of the sensor module.

As seen in FIG. 2, a magnet 112 is affixed to the rear panel 106 of the temperature sensing device 100 to allow the device 100 to be attached to a machine, component, or other surface which a user desires to measure the temperature of. Other removable attachment mechanisms besides magnet 112 may likewise be used, such as adhesives, tapes, glues, or other such means known in the art. Preferably, the attachment mechanism provides thermal transfer between the surface to which it is attached and to the case 102 and/or internal circuitry of the temperature sensing device.

With the schematic and structural configuration of the temperature sensing device set forth, an exemplary use of the temperature sensing device will now be described with reference to FIG. 4.

Figure 4:
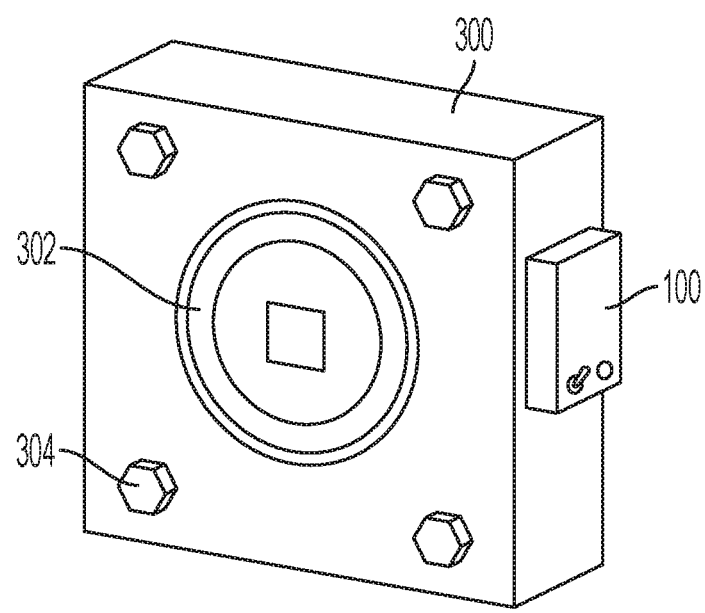
FIG. 4 is a perspective view of the temperature sensing device of claim 3 in use in an exemplary application of measuring a temperature of a bearing housing.

Looking to FIG. 4, a temperature sensing device 100 as just described with respect to FIGS. 1 and 2 is shown attached to a housing 300 supporting a rotational bearing 302. Bolts 304 attach the housing 300 to a machine or apparatus (not shown), with which the bearing is used, and/or attach halves of the housing 300 together.

Typical drive mechanism configurations of various industrial, automotive, and agricultural equipment translate the rotational movement of a drive motor, either directly or through a transmission, to rotate one or more drive shafts which operate various equipment, such as conveyors, augers, drivetrains, and the like. Each drive shaft is typically supported at least at one end by a bearing assembly, such as a rotational bearing, often comprising a plurality of ball bearings encased in a cylindrical sleeve, mounted in a bearing housing or pillow block. The bearing supports the end of the drive shaft and allows the shaft to rotate within the bearing housing.

When operating normally, the bearing provides a relatively low-friction support to the end of the drive shaft. However, when bearings fail, the frictional forces increase dramatically, with the increased friction resulting in overheating of the bearing if allowed to continue to rotate. Failed bearings and the resulting heat often result in fires, with millions of dollars worth of damage attributable to bearing fires each year in the United States alone.

As shown in FIG. 4, with temperature sensing device 100 attached to the bearing housing 300 or pillow block, in normal operating conditions and temperatures, the thermostatic switch of the sensing device 100 will be in the open position, such that no battery power is supplied to the sensor module. Thus, under normal operating conditions of the bearing 302, the battery will experience no current draw from the sensor module of the temperature sensing device 100.

In the event of degradation or failure of the bearing 302, causing the temperature of the bearing to rise, once the temperature of the bearing housing 300 reaches the predetermined threshold of the thermostatic switch in the temperature sensing device 100 (as described previously), the thermostatic switch will close, allowing battery current to flow to the sensor module so that the sensor module begins transmitting temperature data, alerting a user to the rising temperature.

As can be seen, with the battery not needed until the occurrence of a temperature event, the life of the battery may be extended almost indefinitely.

It should be understood that the temperature sensing device of the present invention may likewise be used to monitor the temperatures of other equipment, components, buildings, etc. as desired by a user. And, as discussed above, the temperature sensing device may be configured to detect a temperature falling below a predetermined threshold, such as in detecting the onset of freezing conditions.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Identification of structures as being configured to perform a particular function in this disclosure and in the claims below is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of the claims.

What is claimed is:

1. A temperature sensing device, comprising:
    a sensor module comprising a temperature detecting component, the sensor module operable, when powered by electrical current, to provide a signal corresponding to a detected temperature;
    a battery operable to supply electrical current to the sensor module;
    a thermostatic switch positioned in series between the battery and the sensor module such that current is allowed to flow from the battery to the sensor module when the thermostatic switch is closed and such that current is prevented from flowing from the battery to the sensor module when the thermostatic switch is open;
    a case enclosing the sensor module, battery, and thermostatic switch; and
    an attachment mechanism affixed to the case, the attachment mechanism operable to removably secure the temperature sensing device in thermal communication with a surface of a piece of equipment or component, and wherein the attachment mechanism is in thermal communication with the thermostatic switch and sensor module such that a temperature of the case is transferred to the thermostatic switch and sensor module.

2. The temperature sensing device of claim 1, wherein the thermostatic switch is a mechanical switch.

3. The temperature sensing device of claim 2, wherein the thermostatic switch comprises a bimetallic strip.

4. The temperature sensing device of claim 1, wherein the sensor module further comprises a transmitter configured to wirelessly transmit data corresponding to a detected temperature.

5. The temperature sensing device of claim 1, wherein the thermostatic switch opens when a temperature of the switch is below a predetermined threshold and closes when a temperature of the switch is above a predetermined threshold.

6. The temperature sensing device of claim 1, wherein the thermostatic switch opens when a temperature of the switch is above a predetermined threshold and closes when a temperature of the switch is below a predetermined threshold.

7. The temperature sensing device of claim 1, wherein the attachment mechanism comprises a permanent magnet.

8. A method for wirelessly monitoring a temperature, comprising:
    providing a sensor module according to claim 1, wherein the sensor module further comprises a transmitter configured to wirelessly transmit data corresponding to a detected temperature;
    upon actuation of the thermostatic switch of the sensor module, powering the control circuitry and transmitting data corresponding to a detected temperature.

9. The method of claim 8, further comprising;
    periodically transmitting data corresponding to a detected temperature.

10. A temperature sensing device, comprising:
- a sensor module operable to provide a signal corresponding to a detected temperature when powered by electrical current;
- a battery operable to supply electrical current to the sensor module;
- a thermostatic switch positioned in series between the battery and the sensor module;
- a case enclosing the sensor module, battery, and thermostatic switch; and
- an attachment mechanism affixed to the case, the attachment mechanism in thermal communication with a surface of a piece of equipment or component, and wherein the attachment mechanism is in thermal communication with the thermostatic switch and sensor module such that a temperature of the case is transferred to the thermostatic switch and sensor module.

11. The temperature sensing device of claim 10, wherein the thermostatic switch comprises a bimetallic strip.

12. The temperature sensing device of claim 10, wherein the sensor module comprises a transmitter configured to wirelessly transmit data corresponding to a detected temperature.

13. The temperature sensing device of claim 10, wherein the attachment mechanism comprises a permanent magnet.

* * * * *